Oct. 15, 1957  M. G. BECK  2,809,851

FIFTH WHEEL COUPLER MOUNTING

Filed Oct. 10, 1955

INVENTOR.
Merrill G. Beck
BY
Ralph Hammar
Attorney

United States Patent Office 2,809,851
Patented Oct. 15, 1957

2,809,851

FIFTH WHEEL COUPLER MOUNTING

Merrill G. Beck, Erie, Pa., assignor to Lord Manufacturing Company, Erie, Pa., a corporation of Pennsylvania Application October 10, 1955, Serial No. 539,308

6 Claims. (Cl. 280—438)

In truck trailers where the fifth wheel coupler for the front end of the trailer is substantially above the tractor rear axle, the longitudinal back and forth surging forces of the trailer while traveling on uneven terrain or while starting or stopping exert a shaking torque on the tractor which causes great discomfort to the driver, particularly on tractors of short wheel base and cab-over-engine models. The surging forces may be a combination of inertia forces and traction forces. This invention is intended to decrease the driver discomfort by supporting the coupler by converging mountings focused substantially below the coupler, such mountings lower the effective point at which the longitudinal surging forces are applied to the tractor and reduces the effective shaking movement or torque exerted on the tractor by such forces. If the surging forces were entirely inertia forces, the minimum shaking torque would be obtained when the effective point of application was at the center of gravity of the tractor. For traction forces, the minimum shaking torque is obtained when the effective point of application is at the ground. If the surging forces are a combination of inertia and traction forces, the minimum shaking torque is obtained when the effective point of application is between the center of gravity of the tractor and ground level. In a preferred form, the mountings are converging links pivoted at opposite ends to the coupler and tractor frame by rubber joints and focused to intersect below their plane of attachment in a manner to establish an effective towing point between the center of gravity of the tractor and ground. The rubber joints in addition cushion shock in all directions and can be preset so the coupler, when unloaded, is tilted at the proper angle for coupling to a trailer.

Figure 1:
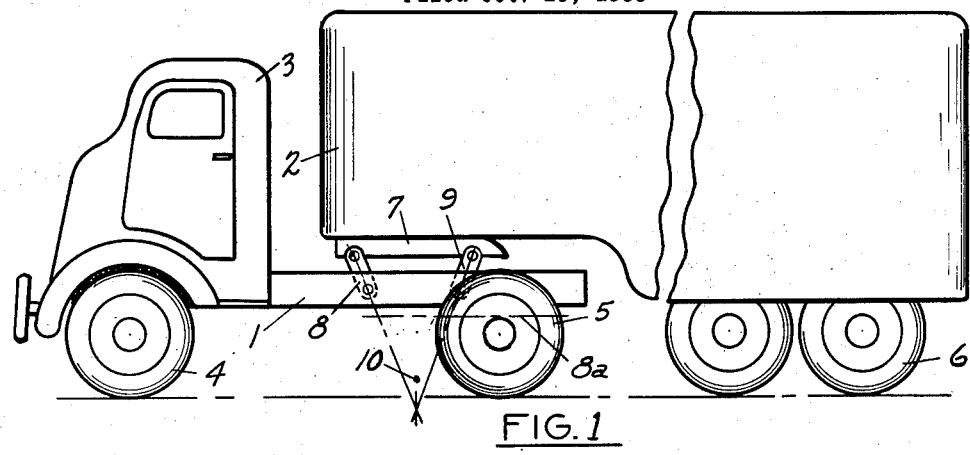
Figure 2:
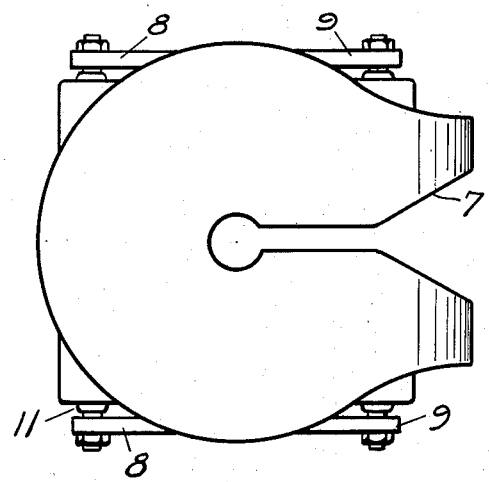
Figure 3:
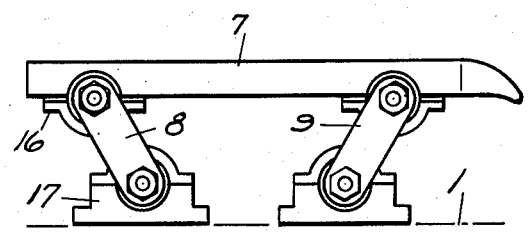
Figure 5:
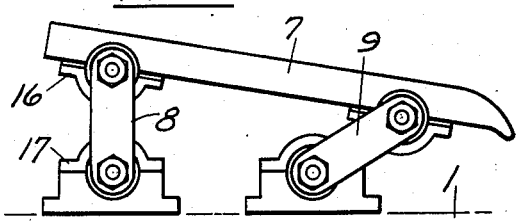
Figure 4:
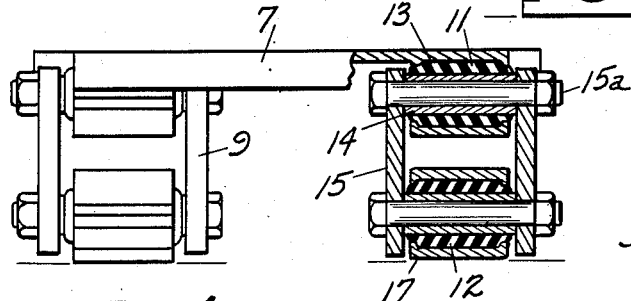

In the drawing, Fig. 1 is a side view of a truck tractor and semi-trailer; Fig. 2 is a top view of the fifth wheel coupler; Fig. 3 is a side view of the fifth wheel coupler; Fig. 4 is an end view, partly in section and Fig. 5 is a side view of the coupler in its unloaded position with the rubber joints preset to tilt the coupler at the proper angle for coupling to a trailer.

In Fig. 1 of the drawing, there is diagrammatically shown a truck tractor frame 1 and a semi-trailer 2. The truck tractor is of the cab-over-engine type with a cab diagrammatically indicated at 3. The tractor has a short wheel base as indicated by the close spacing of front wheels 4 and rear wheels 5. The trailer 2 has rear wheels 6 and has its front end supported on a fifth wheel coupler 7. The parts so far described are or may be of common construction. No attempt has been made to illustrate the common details of structure which are well known.

While traveling over uneven terrain or while starting or stopping, there are oscillating or surging longitudinal forces applied to the coupler 7 by the trailer 2. In the conventional construction where the coupler 7 is pivoted to the tractor at a point substantially above the plane of the tractor center of gravity 8a, these forces have a substantial moment tending to pitch the tractor and cause great discomfort to the driver. This objectionable pitching of the truck tractor is reduced by the mounting for the fifth wheel coupler 7 to be described.

Instead of being pivoted directly to the frame of the truck tractor, the fifth wheel coupler 7 is connected to the truck tractor frame by front and rear mountings or hinge links or struts 8 and 9 which converge or are focused toward each other. If the struts 8 and 9 were of infinite rigidity, the fifth wheel coupler 7 would be effectively supported at the point of apparent convergence or intersection of the struts. However, because the struts 8 and 9 are less than infinitely rigid, the effective point of support will be foreshortened by an amount depending upon the resilience of the struts. For the structure illustrated, the effective foreshortening will place the effective point of support of the fifth wheel coupler at the point marked by the numeral 10 on Fig. 1 of the drawing. The point 10 is above ground level but below a horizontal plane 8a passing through the center of gravity of the tractor. The upper ends of the links 8 and 9 are pivotally connected to the coupler 7 by means of rubber joints 11 and the lower ends of the links are pivotally connected to the truck tractor frame through similar rubber joints 12. Each of the rubber joints 11 and 12 is in the form of a tubular bushing 13 of rubber bonded to a metal tube 14 fastened by a bolt 15a to spaced hanger members 15 which together comprise the hinged links 8 or 9 as the case may be. The outer part of the rubber sleeve 13 is suitably anchored in brackets 16 attached to the underside of the coupler 7 or in brackets 17 suitably connected to the truck tractor frame. The rubber bushings have principal axes of greatest stiffness along the longitudinal center lines or axes of links 8 and 9. This results in an effective point of support for the coupler 7 slightly above the point of intersection of the longitudinal axes of the links 8 and 9 and is very close to the point 10 which provides effective reduction of the longitudinal surging forces on the coupler which rock or pitch the truck tractor. The reduction of this rocking or pitching materially improves the driver comfort. The mountings provided by the links 8 and 9 and the rubber bushings 15a (like all other mountings) have three intersecting principal axes at right angles to each other. See Patent 2,175,999. The principal axes of greatest stiffness are along the center line of links 8 and 9.

The rubber joints 11 and 12 which are relatively soft in a torsional direction provide for tilting of the coupler 7 about a lateral axis and also provide for shock cushioning in a lateral, vertical and longitudinal direction.

Instead of the rubber bushings 11 and 12, metal bearings could be substituted in which case the effective pivot point for the coupler 7 would be at the intersection of the longitudinal axes of the links 8 and 9 rather than slightly above that intersection point. Of course, if metal bearings were substituted for the rubber joints, there would be no cushioning of the sidewise vertical and longitudinal forces. However, the substitution of metal bearings would effectively lower the pivot point for the coupler 7 and thereby reduce the pitching of the truck tractor which causes the driver discomfort.

With the rubber joints, it is possible by fixing the joints in the brackets 16 and 17 with the coupler tilted to the rear of the tractor as shown in Fig. 5 to preset the joints so that the coupler always returns to the inclined position desirable for backing the coupler into a trailer. Of course, as soon as the coupler is backed into the trailer, the coupler necessarily moves to the horizontal position as shown in Figs. 1 and 3.

What is claimed as new is:

1. In a tractor for hauling semi-trailers, a fifth wheel coupler, a support for the coupler comprising fore and aft links hinged at upper and lower ends on axes extending crosswise of the tractor and converging toward an axis extending crosswise of the tractor below both the coupler and the center of gravity of the tractor, brackets for connecting the hinged upper ends of the links to the coupler, and other brackets for connecting the hinged lower ends of the links to the tractor.

2. In a tractor for hauling semi-trailers, a fifth wheel coupler, a support for the coupler comprising fore and aft mountings connected in supporting relation between the coupler and tractor, said mountings each having three principal axes with one of the axes having the greatest stiffness and the other two of the axes having lesser stiffness, the principal axes of greatest stiffness converging toward an axis below the coupler and crosswise of the tractor.

3. The construction of claim 2 in which the mountings include bodies of resilient material for cushioning shocks.

4. In a tractor for hauling semi-trailers, a fifth wheel coupler, a support for the coupler comprising fore and aft links having upper ends longitudinally spaced of the tractor and provided with structure by which the upper ends of the links are pivoted to the coupler on axes extending crosswise of the tractor and having lower ends longitudinally spaced of the tractor and provided with structure by which the lower ends of the links are pivoted to the tractor on axes extending crosswise of the tractor, the axes on which the links are pivoted to the coupler being more widely spaced longitudinally of the tractor than the axes on which the links are pivoted to the tractor whereby the effective pivot axis of the coupler is below the coupler.

5. The construction of claim 4 having the structure by which the links are pivoted to the coupler and to the tractor include inner and outer pivot members and bushings of resilient material between and anchored to said members.

6. The construction of claim 5 in which the bushings are preset to tilt the coupler toward the rear of the tractor in the uncoupled position.

References Cited in the file of this patent

UNITED STATES PATENTS

| | | |
|---|---|---|
| 1,513,381 | Edwards | Oct. 28, 1924 |
| 2,353,267 | Reid | July 11, 1944 |